(12) United States Patent
McGrath et al.

(10) Patent No.: US 11,214,157 B2
(45) Date of Patent: Jan. 4, 2022

(54) ELECTRIC VEHICLE CHARGING TO REDUCE UTILITY COST

(71) Applicant: Proterra Inc., Greenville, SC (US)

(72) Inventors: Seamus T. McGrath, Simpsonville, SC (US); Justin Allen, Greenville, SC (US); Kevin Ertel, Greenville, SC (US)

(73) Assignee: PROTERRA INC., Burlingame, CA (US)

( * ) Notice: Subject to any disclaimer, the term of this patent is extended or adjusted under 35 U.S.C. 154(b) by 675 days.

(21) Appl. No.: 14/985,126

(22) Filed: Dec. 30, 2015

(65) Prior Publication Data

US 2017/0190256 A1 Jul. 6, 2017

(51) Int. Cl.

| | | |
|---|---|---|
| *B60L 53/14* | (2019.01) | |
| *B60L 5/18* | (2006.01) | |
| *B60L 5/42* | (2006.01) | |
| *B60L 53/30* | (2019.01) | |
| *B60L 53/64* | (2019.01) | |
| *B60L 53/66* | (2019.01) | |
| *B60L 53/67* | (2019.01) | |
| *H02J 50/80* | (2016.01) | |
| *B60W 40/12* | (2012.01) | |
| *B60L 53/10* | (2019.01) | |

(52) U.S. Cl.
CPC ............... *B60L 53/14* (2019.02); *B60L 5/18* (2013.01); *B60L 5/42* (2013.01); *B60L 53/32* (2019.02); *B60L 53/64* (2019.02); *B60L 53/665* (2019.02); *B60L 53/67* (2019.02); *B60L 53/10* (2019.02); *B60L 2200/18* (2013.01); *B60L 2240/80* (2013.01); *B60W 40/12* (2013.01); *H02J 50/80* (2016.02); *Y02T 10/70* (2013.01); *Y02T 10/7072* (2013.01); *Y02T 90/12* (2013.01); *Y02T 90/14* (2013.01); *Y02T 90/16* (2013.01); *Y02T 90/167* (2013.01); *Y04S 30/14* (2013.01)

(58) Field of Classification Search
CPC .. Y02T 90/165; Y02T 90/121; B60L 11/1824; B60L 11/1837; B60L 11/184; B60L 11/1842; B60L 11/1848; B60L 11/185; B60L 2260/52; B60L 2260/54; B60L 2260/44; H02J 7/0027; Y04S 30/10; Y04S 30/12; Y04S 30/14
USPC .......................................... 320/109
See application file for complete search history.

(56) References Cited

U.S. PATENT DOCUMENTS

| | | | | |
|---|---|---|---|---|
| 3,602,703 | A * | 8/1971 | Polenz ...................... | H02J 3/14 700/291 |
| 4,684,872 | A * | 8/1987 | Stewart ................. | H02J 7/0021 320/125 |
| 5,927,598 | A * | 7/1999 | Broe ........................ | H02J 3/14 236/46 R |
| 7,991,513 | B2 * | 8/2011 | Pitt ........................ | G06Q 30/02 700/295 |

(Continued)

*Primary Examiner* — David V Henze-Gongola
*Assistant Examiner* — Tarikh Kanem Rankine
(74) *Attorney, Agent, or Firm* — Bookoff McAndrews, PLLC

(57) ABSTRACT

A method for controlling the charging of one or more electric vehicles at one or more charging stations in a geographic locality includes determining if the charging event of an electric vehicle of the one or more electric vehicles increases a demand billing rate. The demand billing rate may be a cost per unit of energy in the locality. The method also includes charging the electric vehicle at the charging event such that the demand billing rate is not increased.

16 Claims, 4 Drawing Sheets

(56) References Cited

U.S. PATENT DOCUMENTS

| | | | |
|---|---|---|---|
| 8,453,773 B2 | 6/2013 | Hill et al. | |
| 9,509,159 B2* | 11/2016 | Yonetani | H02J 3/32 |
| 9,727,068 B2* | 8/2017 | Kamel | G01R 21/1333 |
| 2005/0165511 A1* | 7/2005 | Fairlie | F17D 1/04 |
| | | | 700/286 |
| 2006/0276938 A1* | 12/2006 | Miller | G06Q 50/06 |
| | | | 700/295 |
| 2008/0046387 A1* | 2/2008 | Gopal | G01D 4/004 |
| | | | 705/412 |
| 2010/0174667 A1* | 7/2010 | Vitale | B60L 3/0069 |
| | | | 705/412 |
| 2010/0207728 A1* | 8/2010 | Roscoe | H02J 3/14 |
| | | | 340/10.1 |
| 2010/0280675 A1* | 11/2010 | Tate, Jr. | H01M 10/44 |
| | | | 320/109 |
| 2011/0040666 A1* | 2/2011 | Crabtree | G06Q 30/0283 |
| | | | 705/37 |
| 2011/0055036 A1* | 3/2011 | Helfan | G06Q 30/04 |
| | | | 705/26.1 |
| 2011/0074350 A1* | 3/2011 | Kocher | B60L 11/1844 |
| | | | 320/109 |
| 2011/0202418 A1* | 8/2011 | Kempton | H02J 3/008 |
| | | | 705/26.1 |
| 2012/0095830 A1* | 4/2012 | Contreras Delpiano | |
| | | | G06Q 30/02 |
| | | | 705/14.49 |
| 2012/0235646 A1* | 9/2012 | Lo | B60L 53/63 |
| | | | 320/137 |
| 2012/0280656 A1* | 11/2012 | Bedell | B60L 3/0069 |
| | | | 320/109 |
| 2012/0316695 A1* | 12/2012 | Chen | H02J 3/008 |
| | | | 700/296 |
| 2012/0316714 A1* | 12/2012 | Nagayanagi | B60L 7/18 |
| | | | 701/22 |
| 2013/0006677 A1* | 1/2013 | Anglin | G05F 5/00 |
| | | | 320/109 |
| 2013/0054045 A1* | 2/2013 | Ramezani | B60L 11/1824 |
| | | | 700/297 |
| 2013/0193918 A1 | 4/2013 | Sarkar et al. | |
| 2013/0191321 A1* | 7/2013 | Lovett | B60L 11/1809 |
| | | | 706/58 |
| 2013/0197710 A1* | 8/2013 | Hansen | B60L 11/1824 |
| | | | 700/297 |
| 2013/0332327 A1* | 12/2013 | Sgouridis | G06Q 40/04 |
| | | | 705/37 |
| 2014/0070767 A1 | 3/2014 | Morris et al. | |
| 2014/0084685 A1* | 3/2014 | Bienfang | H02J 7/00 |
| | | | 307/23 |
| 2014/0136010 A1* | 5/2014 | Takehara | H02J 3/32 |
| | | | 700/295 |
| 2014/0172503 A1* | 6/2014 | Hammerstrom | G06Q 30/0206 |
| | | | 705/7.31 |
| 2015/0069970 A1 | 3/2015 | Sarkar et al. | |
| 2015/0081122 A1* | 3/2015 | Yonetani | G06Q 50/06 |
| | | | 700/291 |
| 2015/0165915 A1* | 6/2015 | Cun | H02J 7/35 |
| | | | 320/101 |
| 2015/0165922 A1* | 6/2015 | Worley, III | G05D 1/104 |
| | | | 320/108 |
| 2015/0217754 A1* | 8/2015 | MacNeille | B60L 58/10 |
| | | | 701/22 |
| 2015/0286965 A1* | 10/2015 | Amano | B60L 53/68 |
| | | | 705/5 |

\* cited by examiner

ELECTRIC VEHICLE CHARGING TO REDUCE UTILITY COST

TECHNICAL FIELD

The current disclosure relates to systems and methods of charging electric vehicles to reduce utility cost. In particular, the current disclosure relates to a control system that controls the charging of an electric vehicle based on the prevailing utility rates in an area.

BACKGROUND

An electric vehicle uses an electric motor for propulsion. Electric vehicles include all-electric vehicles where the electric motor is the sole source of power, and hybrid vehicles that include another power source in addition to the electric motor. In an electric vehicle, energy may be stored in batteries to power the motor. When the stored energy decreases, the batteries may be recharged using an external power supply. Typically, the size, architecture, chemistry, etc. of the batteries determine its range (i.e., the distance the vehicle can travel between recharges) and the time it takes to recharge the batteries (recharge time).

In applications where it is important to charge the batteries quickly, fast-charge batteries may be used. Fast-charge batteries may be charged to substantially full capacity quickly at high power levels (i.e., rate of energy transfer). The range of fast-charge batteries are typically low, therefore, these buses are recharged periodically (e.g., between 5-20 miles). The cost of energy in some geographic locations vary with the rate of energy consumption. In some applications, significant savings may be realized by controlling the charging of the vehicle based on prevailing utility cost.

Embodiments of the current disclosure may alleviate some of the problems discussed above and/or other problems in the art. The scope of the current disclosure, however, is defined by the attached claims, and not by the ability to solve any specific problem.

SUMMARY

Embodiments of the present disclosure relate to, among other things, systems and methods for controlling the charging of electric vehicles based on utility costs. Each of the embodiments disclosed herein may include one or more of the features described in connection with any of the other disclosed embodiments.

In one embodiment, a method for controlling the charging of one or more electric vehicles at one or more charging stations in a geographic locality is disclosed. Each electric vehicle of the one or more electric vehicles may be configured to be charged at a charging station of the one or more charging stations at a charging event. The method may include determining if the charging event of an electric vehicle of the one or more electric vehicles increases a demand billing rate. The demand billing rate may be a cost per unit of energy in the locality. The method may also include charging the electric vehicle at the charging event such that the demand billing rate is not increased.

In another embodiment, a method for charging an electric bus at a charging station is disclosed. The method includes electrically coupling the bus at the charging station to begin a charging event, and determining a maximum amount of energy ($E_{MAX}$) that can be consumed by the charging station in a reference time period without increasing a demand billing rate. The demand billing rate may be a cost per unit of energy consumed by the charging station. The method may also include determining the total amount of energy already consumed ($E_{USED}$) by the charging station in the reference time period. The method may also include estimating the energy needed ($E_{NEED}$) by the bus during the charging event and determining if $E_{NEED}$ exceeds ($E_{MAX}-E_{USED}$). The method may further include providing an amount of energy equal to $E_{NEED}$ to the bus if $E_{NEED}$ does not exceed ($E_{MAX}-E_{USED}$).

In yet another embodiment, a charging station for an electric vehicle is disclosed. The charging station includes a charging head configured to electrically couple with and charge an electric vehicle during a charging event and a control system. The control system may be configured to determine if the charging event will increase a demand billing rate. The demand billing rate may be a cost charged per unit of energy consumed by the charging station. The control system may also be configured to charge the electric vehicle at the charging event such that the demand billing rate is not increased.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

The present disclosure describes a control system and a method of controlling the charging of electric buses to reduce utility cost. While principles of the current disclosure are described with reference to an electric bus, it should be understood that the disclosure is not limited thereto. Rather, the systems and methods of the present disclosure may be used to control the charging of any electric vehicle (one or more taxis, etc.).

Figure 1:
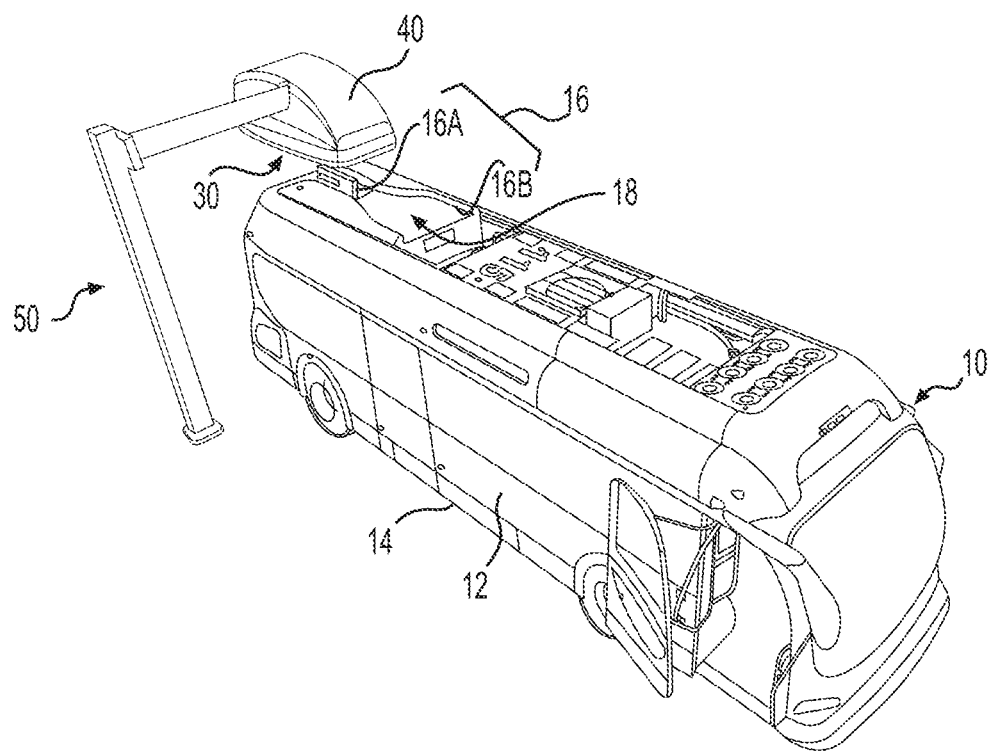
FIG. 1 is an illustration of an exemplary electric bus.

FIG. 1 illustrates an electric vehicle in the form of a low-floor electric bus 10. Electric bus 10 may include a body 12 enclosing a space for passengers. In some embodiments, some (or substantially all) parts of the body 12 may be fabricated using composite materials to reduce the weight of bus 10. As is known in the art, in a low-floor bus, there are no stairs at the front and/or the back doors of the bus. In such a bus, the floor is positioned close to the road surface to ease entry and exit into the bus. In some embodiments, the floor height of the low-floor bus may be about 12-16 inches (30-40 centimeters) from the road surface. Body 12 of bus 10 may have any size, shape, and configuration.

Bus 10 may include an electric motor that generates power for propulsion and a battery system 14 that provides power to the electric motor. In some embodiments, the battery system 14 may be positioned under the floor of the bus 10. The batteries of battery system 14 may have any chemistry and construction. In some embodiments, the batteries may be lithium titanate oxide (LTO) batteries. In some embodiments, the batteries may be nickel manganese cobalt (NMC) batteries. LTO batteries may be fast-charge batteries that may allow the bus 10 be recharged to substantially its full capacity in a small amount of time (e.g., about ten minutes or less). In this disclosure, the terms "about," "substantially," or "approximate" are used to indicate a potential variation of 10% of a stated value.

Due to its higher charge density, NMC batteries may take longer to charge to a comparable state of charge (SOC), but NMC batteries may retain a larger amount of charge and thus increase the range of the bus 10. State of charge (SOC) is the equivalent of fuel level in a hydrocarbon (e.g., gasoline, diesel, etc.) powered vehicle. SOC indicates the amount of residual energy in the battery system 14 of the bus 10. The SOC of a battery system 14 (or bus 10) is defined as the available energy capacity expressed as a percentage of its rated capacity or present capacity (i.e., taking age into account). The units of SOC are percentage points, where an SOC of 0% indicates that the battery system 14 is completely empty and an SOC of 100% indicates that the battery system is full. In some embodiments, battery system 14 may include batteries of multiple chemistries. For instance, some of the batteries may be LTO or NMC batteries, while other batteries may have another chemistry (for example, iron-phosphate, lead-acid, nickel cadmium, nickel metal hydride, lithium ion, zinc air, etc.). Some of the possible battery chemistries and arrangements in bus 10 are described in commonly assigned U.S. Pat. No. 8,453,773, which is incorporated herein by reference in its entirety.

Although the battery system 14 is illustrated and described as being positioned under the floor of the bus 10, this is only exemplary. In some embodiments, some or all of the batteries in battery system 14 may be positioned elsewhere on the bus 10. For example, some of the battery packs may be positioned on the roof of bus 10. As the battery system 14 may have considerable weight, integrating the battery system into the floor of bus 10 may keep its center of gravity lower and balance weight distribution, thus increasing drivability and safety.

A charging interface 16 may be provided on the roof 18 of the bus 10 to charge the batteries of the battery system 14. The charging interface 16 may include a charging blade 16A and an alignment scoop 16B. The charging blade 16A may include electrodes that are electrically coupled to the battery system 14. The alignment scoop 16B may include a pair of curved rails, positioned on either side of the charging blade 16B, that forms a funnel-shaped alignment feature. The charging interface 16 may engage with a charge head 30 (positioned within a charge head assembly 40) of an external charging station 50 to charge the battery system 14. The charging station 50 may be provided at any location (bus depot, road side, etc.) and may be powered by an electric utility grid.

To charge the bus 10, the bus 10 may be positioned under the overhanging charge head assembly 40 of the charging station 50. When the bus 10 is thus positioned, the charge head 30 may descend from the charge head assembly 40 to land on the roof 18 of the bus 10. With the charge head 30 resting on the roof 18, the bus 10 may be moved forward to engage the charge head 30 with the charging blade 16A. As the charge head 30 slides on the roof 18 towards the charging blade 16A, the funnel-shaped alignment scoop 16B may align and direct the charge head 30 towards the charging blade 16A. Details of the charge head 30 and the interfacing of the charge head 30 with the charging interface 16 are described in commonly assigned U.S. Patent Application Publication Nos. US 2013/0193918 A1 and US 2014/0070767 A1, which are incorporated by reference in their entirety herein. Alternatively or additionally, bus 10 may also include an on-board charging device to charge the battery system 14. The on-board charging device may include an auxiliary power generation device (such as, an internal combustion engine or a fuel cell) that generates power to charge the battery system 14.

Figure 2:
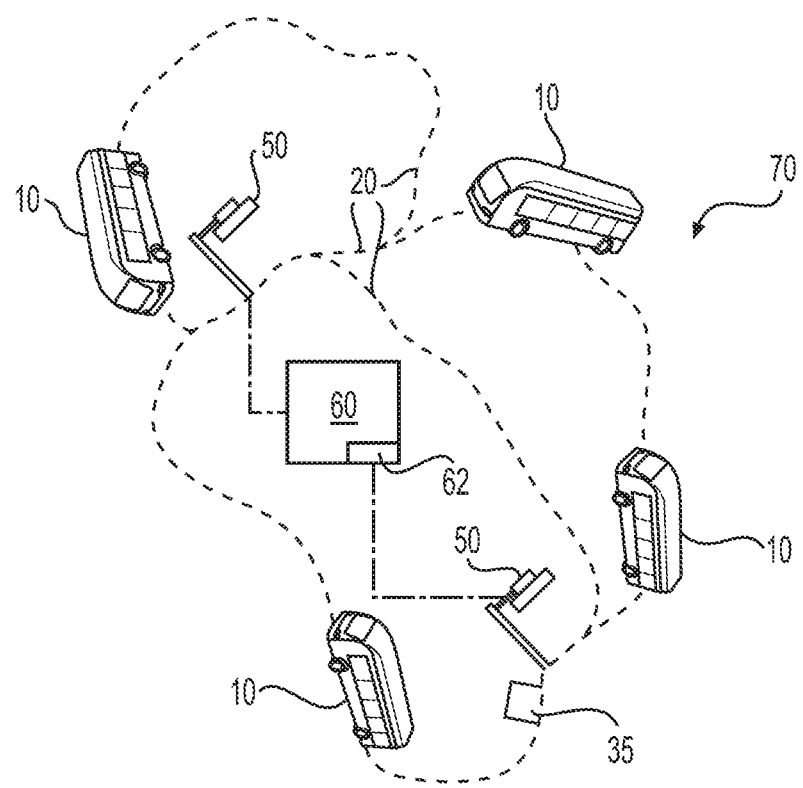
FIG. 2 is a schematic illustration of the electric bus of FIG. 1 operating in a geographic area.

FIG. 2 is a schematic illustration of a fleet of transit electric buses 10 operating along several fixed routes 20 in a geographic area 70. Geographic area 70 may include any area (airport, university campus, city, town, county, etc.) that is serviced by the buses 10. The fleet may include any number of buses 10. One or more charging stations 50 may be positioned along the different routes 20 to charge the buses 10 that circulate on these routes 20 on a fixed schedule. The charging stations 50 may be coupled to an electric grid that is supplied with energy (electricity) by a utility company that services the geographic area 70. When a bus 10 pulls up to a charging station 50, the charge head 30 (see FIG. 1) of the charging station 50 engages with the charging interface 16 of the bus 10 to charge its battery system 14. After charging, the charge head 30 decouples from the charging interface 16 and the bus 10 proceeds along its route 20. After completing the route 20 (or along its route), the bus 10 may pull into the same or a different charging station 50 for recharging. After recharging, the bus 10 may continue to repeat its fixed route 20. In some embodiments, the charging stations 50 may be positioned such that they can service the buses 10 operating on several different routes 20.

In some embodiments, one or more of the charging stations 50 may also include an energy storage device 35 (capacitor, battery, etc.) electrically coupled thereto. The bus 10 may be recharged using energy from the grid, energy from the energy storage device 35, or using energy from both the grid and the device 35. In some embodiments, energy from the electric grid may be used to charge the energy storage device 35 when the energy cost is lower, and this stored energy may be used to charge a bus 10 when the energy cost is higher. Some possible embodiments of such energy storage devices are described in commonly-assigned U.S. Patent Application No. 2015/0069970 A1 which is incorporated by reference in its entirety herein.

The utility company may charge the bus operator (or a transportation authority operating a fleet of buses) for the energy consumed in charging the buses 10 based on a prevailing tariff schedule. The tariff schedule documents the cost per unit of electricity (for example, $/kilo Watt hr.) as a function of several factors. These factors may vary with the geographic area 70, and include variables such as the season, time of use, rate of energy consumption (i.e., power), total energy consumed, voltage, etc. Typically, energy cost is higher when the demand for energy is higher (e.g., Summer months, and times between 8 AM-10 AM, 4 PM-6 PM, etc.) and lower when the demand is lower (e.g., Winter months, times between 10 AM-4 PM and 6 PM-8 AM, etc.). For a commercial consumer, the energy cost may follow a tiered approach. That is, the energy cost may change with the total power consumed. For example, total power consumption (per billing cycle) between 20 kilo Watts (kW) and 1 Mega Watt (MW) may be charged at a first rate, between 1-50 MW may be charged at a second rate, and above 50 MW may be charged at a third rate.

The cost of electricity typically includes a "consumption charge" and a "demand charge." The consumption charge accounts for the actual cost for the generation of the consumed amount of electricity (e.g., fuel costs, etc.), and the demand charge accounts for fixed overhead costs. Although both consumption and demand charges are part of every electricity consumer's utility bill, residential customers usually pay one rate for electricity service, covering both consumption and demand. This combined charge is possible because there is relatively little variation in electricity use from home to home. However, for most commercial and industrial energy users, both consumption and demand vary greatly. Commercial customers (such as, operators of electric buses and charging stations) need large amounts of electricity once in a while. For example, some charging stations 50 charge a bus 10 at a relatively high energy transfer rate of 400 kW for a few minutes (e.g., 3 minutes). If this charging station 50 charges four buses in an hour, the charging station 50 is operational for only a small fraction of an hour (i.e., operational for 12 minutes of an hour). Meeting such a customer demand requires keeping a vast array of expensive equipment (transformers, substations, generating stations) on constant standby. These costs account for the demand charges.

Demand charges vary as a function of the rate at which energy is consumed (i.e., power consumption). That is, the cost for 100 kWhr of energy will be higher if this amount of energy were consumed in one unit of time (unit of time=1 minute, 15 minutes, 30 minutes, etc.) than if it were consumed over a longer time period (for example, in two units of time). For example, the cost per unit of energy is lower if the rate of energy consumption (typically measured as the total energy consumption for a reference time period, e.g., 15 minutes) is below a certain value, and higher if the rate of energy consumption is above this value. Typically utility companies monitor the total energy usage for a reference time period (e.g., 15-minute time window) to determine the demand billing rate (i.e., cost/kW) for utility cost calculations. In some geographic areas 70, the peak energy consumption in a 15-minute window in a billing cycle may be used to calculate the total energy cost for the entire billing cycle. For example, if during one 15-minute window during the billing cycle, the total energy consumption was 3 times the average for the rest of the billing cycle, the total energy cost for the entire billing cycle may be calculated at the higher rate (demand billing rate). The utility company may periodically revise the tariff schedule and communicate this revised schedule to the transportation authority and other consumers.

A control system 60 may control the charging of the buses 10 based upon the tariff schedule. The control system 60 may be positioned at any location (or distribute among multiple locations) and include one or more computer systems or electronic devices interconnected together in a wired or wireless manner. In some embodiments, the control system 60 may be located at a charging station 50. In some embodiments, control system 60 may reside in one or more computer servers in the offices of the transportation authority or at another site remote from a charging station 50. The control system 60 may be configured to receive data (wirelessly or over a wired network) from, among others, some or all of the buses 10 operating in area 70, charging stations 50, the utility company, and the transportation authority. The control system 60 may also be configured to store data, perform computations, and relay data and/or instructions to some or all of the buses 10 and/or the charging stations 50. In some embodiments, the control system 60 may also include input devices (such as, for example, keyboards, disk/CD/DVD readers, memory card readers, etc.) configured to input data into the control system 60, and output devices (display devices, printers, disk/CD/DVD/memory card writers) configured to output data and information. The control system 60 may also be configured to store data 62 and other information, and perform computations on the stored and received data.

The data 62 stored in the control system 60 may include the prevailing tariff schedule in geographic area 70. Data 62 may also include, among others, information regarding the routes 20, buses 10, drivers, and the passengers. Information regarding the routes 20 may include GPS locations of the different routes 20, bus schedules (bus times along different routes), distance of the routes, distance between stops along a route 20, location of charging stations 50 along the routes 20, etc. Information regarding the buses 10 may include bus identifying information, energy storage capacity (e.g., based on size of battery system 14, age of battery system, etc.), expected energy consumption data (e.g., based upon historic energy consumption (miles/kWhr), the age, and state of repair of the bus), etc. of the buses 10. Information regarding the drivers may include the driving habits of the drivers based on historical data. And, information regarding the passengers may include historical data on the expected number of passengers at different stops along a route 20 at different times.

In some embodiments, the data 62 stored in the control system 60 may include a default charging schedule for the buses 10. Among other information, the default charging schedule may indicate the charging times (time of day) for different buses, the amount of energy to provide to the buses, and the charging rate (rate of charging) to be used during a charging event. In fast-charge applications, it may be desirable to charge a bus quickly. Therefore, in some embodiments, the charging schedule may list a fast charging rate (e.g., fastest charging rate that can be safely employed by the charging station) as the default charging rate. In some embodiments, the default charging schedule may be preprogrammed into the control system 60. In some embodiments, the default charging schedule may be determined, or revised as needed, based, for example, on information of the route 20 and the buses 10 that operate on the route 20. In some embodiments, the default charging schedule may specify charging a bus 10 at the beginning or completion of its route 20. For example, a transit bus 10 operating on a cyclic fixed route (e.g., a 5 mile loop around a school campus) may be charged at a charging station 50 at the beginning or the end of its route.

In some embodiments, the default charging schedule may indicate charging a bus 10 to its maximum state of charge (SOC) every time the bus 10 is charged at a charging station 50. That is, with reference to the example above, even if the bus 10 that operates around a 5 mile loop has 80% SOC when it pulls in for charging, and the bus consumes only about 10% of its SOC to complete the 5 mile route, the bus 10 may be charged to about 100% SOC during each charging event. However, in some cases, charging the bus to 100% SOC may increase the total energy consumed by the charging station 50 during a time of reference that the utility company uses to monitor power consumption (e.g., 15 minute time window), and thus increase the demand billing rate at which utility cost is calculated for the entire billing cycle. Therefore, in some embodiments, the control system 60 may revise or modify the default charging schedule based on prevailing utility rates to minimize utility cost.

Figure 3A:
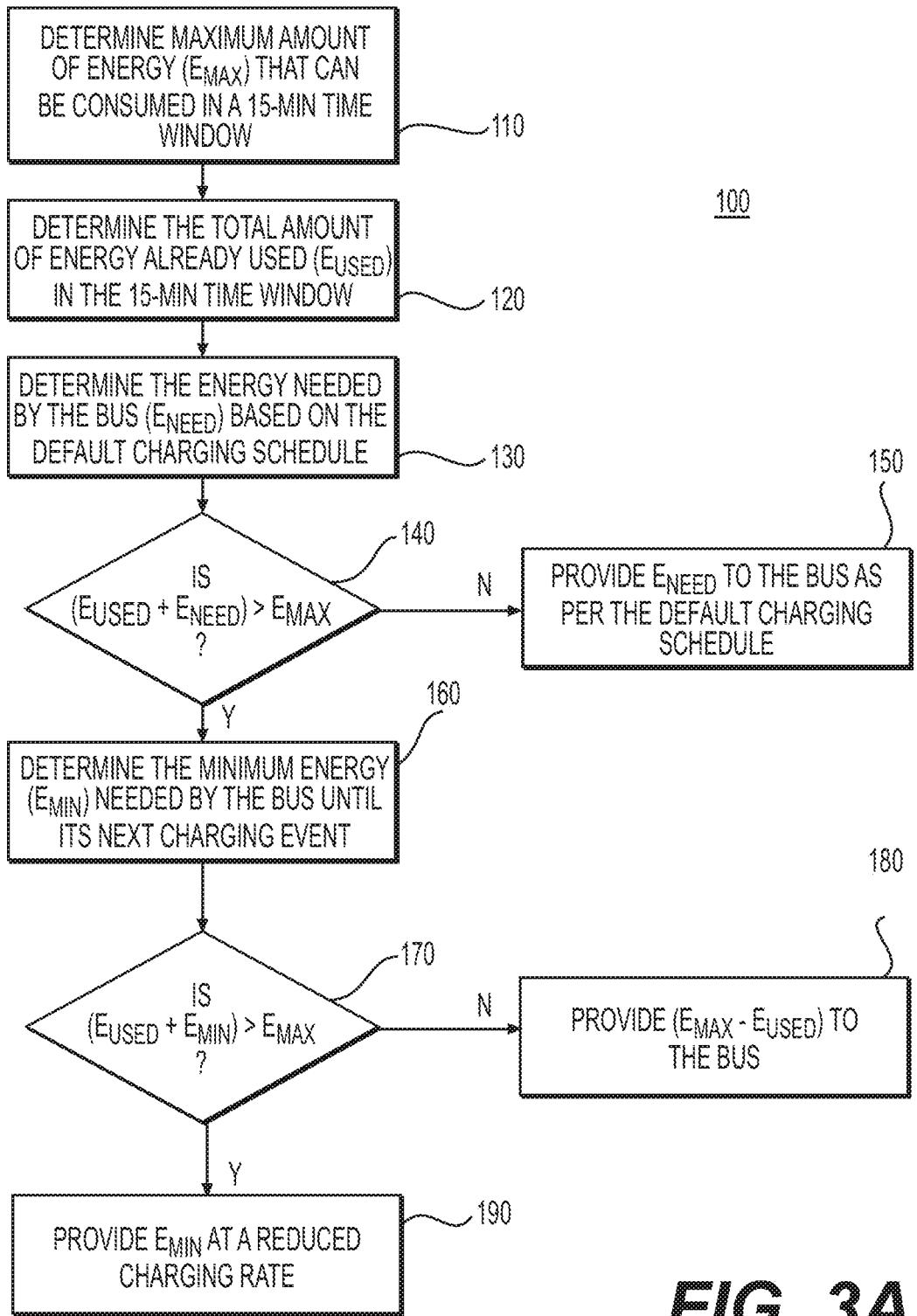
FIG. 3A is a flow chart illustrating an exemplary method of charging the electric bus of FIG. 1 at a charging station.

FIG. 3A is a flow chart of an exemplary method 100 used by control system 60 to charge a bus 10 that docks with a charging station 50. In the discussion below, for the sake of simplicity, it is assumed that geographical area 70 includes only a single charging station 50 which charges multiple buses 10 operating in the area 70. However, as would be recognized by a person of ordinary skill in the art, the method described below is broadly applicable to a geographical area 70 having any number of charging stations 50 charging the buses 10. Further, in the discussion below, an exemplary time of reference of 15 minutes is used. However, in general, the time of reference can be any time period (e.g., 10 min, 30 min, 1 hour, etc.). FIG. 4 is an exemplary schematic illustrating the energy consumed by the charging station 50 over time. In FIG. 4, times $t_0$ and $t_{15}$ indicate the start and end of a current time window 300, and time $t_i$ indicates the current point of time. Sections 310, 320, and 330 in the energy consumption curve of FIG. 4 represent time periods at which buses were charged (prior to the current time $t_i$), and plateaus 315, 325, and 335 illustrate time periods when the charging station 50 was idle (i.e., buses were not being charged). In the discussion below, reference will be made to both FIGS. 3 and 4.

In method 100, the maximum amount of energy ($E_{MAX}$) that can be consumed in the 15 minute time window 300 (or any other reference time period (10 min, 30 min, 1 hr., etc.) used by the utility company) without triggering a rate hike is first determined (step 110). $E_{MAX}$ may be an arbitrary value selected by the transportation authority that operates the buses, or it may be a value determined by some method. In some embodiments, $E_{MAX}$ may be calculated based on historic energy consumption data. For example, previous billing data may indicate that an average amount of energy consumption per hour was (for e.g.,) 120 kWhr. Based on this information, $E_{MAX}$ for the 15 minute time window 300 may be determined as 120/4=30 kW. In some embodiments, $E_{MAX}$ may be determined based on a schedule optimization routine. For example, based on the schedule of the buses 10 operating in the geographic area 70 and other factors (passenger load, cost, etc.), an optimization algorithm may determine $E_{MAX}$ as the value of energy consumption that optimizes efficiency and cost. This predetermined value of $E_{MAX}$ may be programmed into control system 60.

The control system 60 may track the total amount of energy used ($E_{USED}$) by the charging station 50 during the 15 minute time window 300 up to the current point of time $t_i$ (step 120). The control system 60 may determine $E_{USED}$ by summing the energy consumed by the charging station 50 between times $t_0$ and $t_1$ in the time window 300. In embodiments where the geographic area 70 includes multiple charging stations 50 for charging buses 10, $E_{USED}$ may be determined as the total energy consumed by all the charging stations 50 in the time window 300 up to current time $t_i$.

The control system 60 may then determine the amount of energy needed ($E_{NEED}$) by the bus 10 based on the default charging schedule (step 130). In some embodiments, $E_{NEED}$ may be determined based on the residual SOC (i.e., SOC before charging begins) of the bus 10 and its battery capacity. In some embodiments, the bus 10 may inform (transmit, etc.) the control system 60 of its current SOC prior to, or after, docking with the charging station 50. In some embodiments, the bus 10 may also indicate the capacity of its battery system 14 to the control system 60. In some embodiments, the data 62 stored in control system 60 may include information related to the battery capacity. In embodiments where the default charging schedule requires the bus 10 to be charged to 100% SOC, in step 130, control system 60 may determine $E_{NEED}$ as (1−residual SOC)×battery capacity. Similarly, in embodiments where the charging schedule requires the bus 10 to be charged to a different SOC (e.g., 90% SOC), $E_{NEED}$ may be calculated as 0.9×(1−residual SOC)×battery capacity.

The control system 60 may then determine whether $E_{MAX}$ (i.e., maximum amount of energy that can be consumed in the reference time period without triggering a rate hike) will be exceeded if the bus 10 is provided with the amount of energy it needs ($E_{NEED}$) to satisfy the default charging schedule (step 140). That is, in step 140, the control system 60 may determine if $E_{USED}+E_{NEED}>E_{MAX}$ for the time period. If it is not, then the bus 10 may be charged as per the default charging schedule (step 150). That is, in step 150, the bus 10 may be provided with an amount of energy equal to $E_{NEED}$ at the default charging rate.

If $E_{USED}+E_{NEED}$ is determined to be greater than $E_{MAX}$ in step 140, then the control system 90 may determine the minimum amount of energy ($E_{MIN}$) needed by the bus 10 to complete its route (step 160). As explained previously, the control system 60 may have data 62 that includes information regarding the routes 20 of the buses 10 and historical data of the buses 10. Based on this information, in step 160, the control system 60 may determine how much energy is actually consumed by the bus 10 between two successive charging events. In embodiments where the bus 10 completes its route 20 and returns to the same charging station 50 for charging, the control system 60 may determine the energy consumed by the bus 10 to complete its route 20. In embodiments where geographic area 70 includes multiple charging stations 50, and the bus 10 charges at different charging stations 50 along its route 20, the control system 60 may determine the amount of energy consumed as the bus 10 travels from the current charging station 50 to the next.

In some embodiments, factors that may affect energy consumption of the bus 10 (e.g., weather, time of day, traffic, etc.) may also be included in the determination of $E_{MIN}$. For instance, on hot (i.e., ambient temperature $T_{AMBIENT}\geq$ a first threshold temperature) or cold ($T_{AMBIENT}\leq$ a second threshold temperature) days and/or if snow is present or expected on the route 20, the control system 60 may increase $E_{MIN}$ to account for the additional energy that may be needed to operate the HVAC system as the bus 10 travels between two successive charging events. Similarly, if the time of day and/or traffic information indicates that the traffic is high on the route 20, the control system 60 may increase $E_{MIN}$ to account for possible traffic related delays. Additionally or alternatively, in some embodiments, a factor of safety (10%, 20%, etc.) may be added to the $E_{MIN}$ calculated in step 160 to account for unexpected factors that may increase energy consumption.

The control system 60 may then determine whether $E_{MAX}$ will be exceeded if the bus 10 is provided with the minimum amount of energy ($E_{MIN}$) it needs until the next charging event (e.g., energy needed to complete its route 20) (step 170). That is, in step 170, control system 60 may check to determine if $E_{USED}+E_{MIN}>E_{MAX}$. If it is not, then the bus 10 may be provided with an amount of energy equal to $E_{MAX}−E_{USED}$ (i.e., the available amount of energy, $E_{AVAILABLE}$, that can be consumed by the charging station without exceeding $E_{MAX}$) at the default charging rate (step 180). It is also contemplated that, in some embodiments, the bus 10 may be provided with an amount of energy equal to $E_{MIN}$ (i.e., the amount of energy it actually needs until the next charging event) at the default charging rate in step 180. Providing an amount of energy equal to $E_{MAX}−E_{USED}$, or $E_{AVAILABLE}$, in step 180 provides an additional amount of energy in excess of the actual amount of energy the bus needs until the next charging event (i.e., $E_{MIN}$). If $E_{USED}+E_{MIN}$ is greater than $E_{MAX}$ (i.e., step 170 is Yes) then the control system 60 may provide an amount of energy equal to $E_{MIN}$ to the bus 10 at a reduced charging rate (step 190). This reduced charging rate may be such that the demand limit for the predetermined time period (15 mins in this exemplary embodiment) is not exceeded. That is, the reduced charging rate may be selected such that only an amount of energy equal to $E_{AVAILABLE}$ is provided to the bus 10 in the remaining amount of time in the current time window ($\Delta t = t_{15} - t_i$ in FIG. 4). The remaining amount of energy (i.e., $E_{MIN} - E_{AVAILABLE}$) may be provided to the bus 10 after the expiry of the time window (i.e., after $t_{15}$ in FIG. 4). An exemplary embodiment of step 190 of FIG. 3A is explained in more detail in the embodiment described below.

Figure 3B:
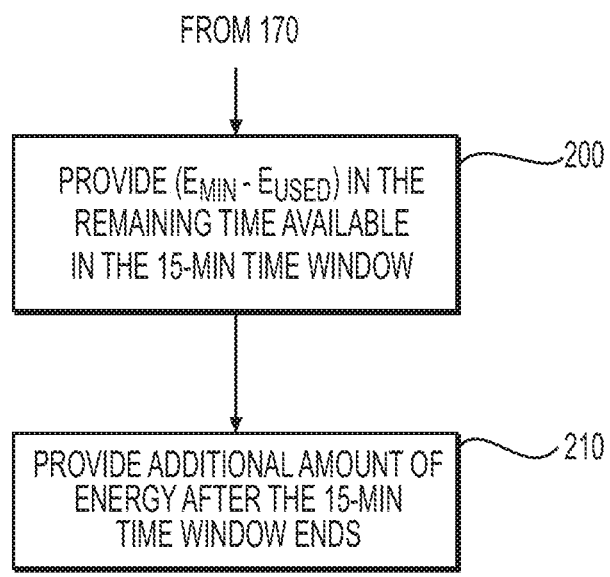
FIG. 3B is a flow chart illustrating another exemplary method of charging the electric bus of FIG. 1.
Figure 4:
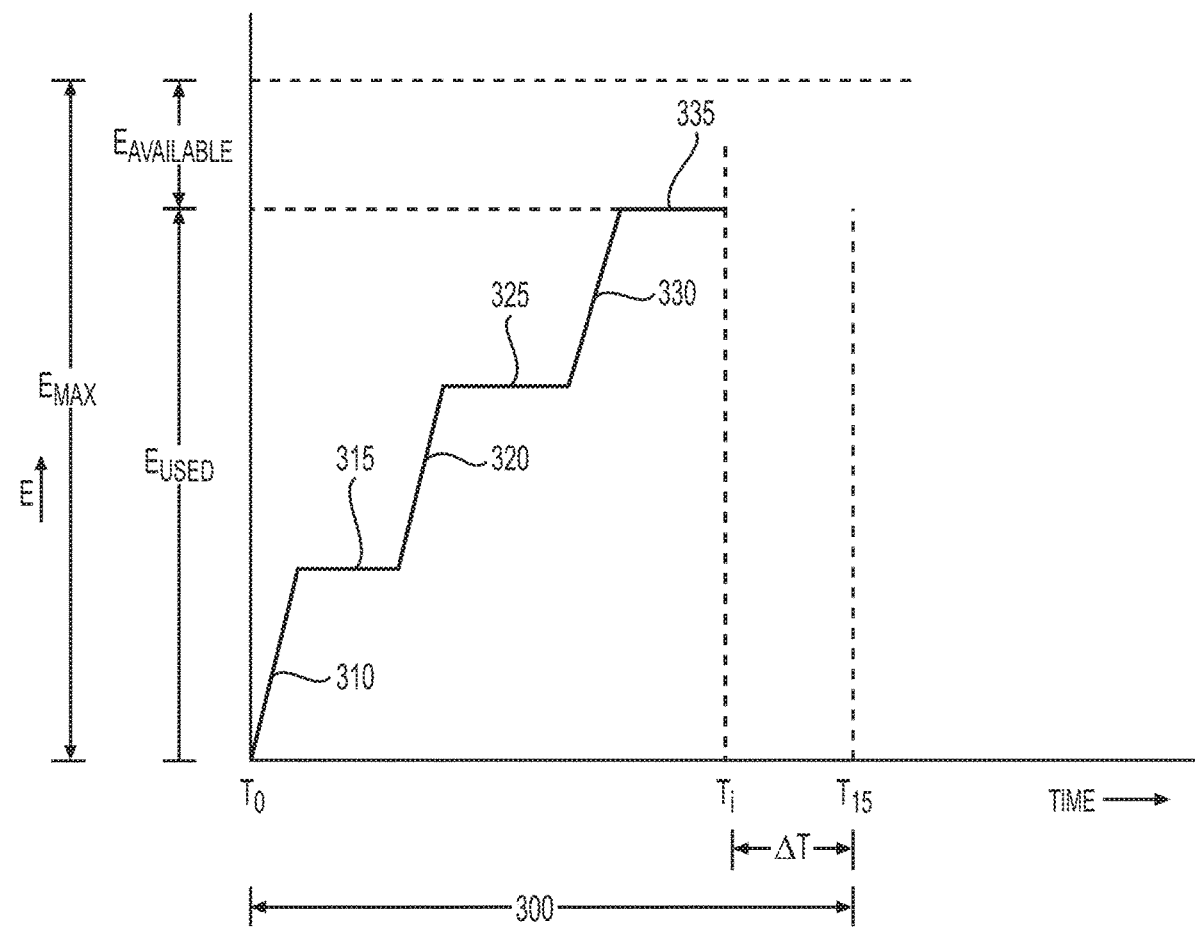
FIG. 4 is a schematic illustration of en exemplary energy consumption curve of the charging station.

FIG. 3B illustrates another exemplary embodiment of charging the bus at the charging station. In this embodiment, if $E_{USED} + E_{MIN}$ is greater than $E_{MAX}$ (i.e., step 170 of FIG. 3A is Yes), then the control system 60 may provide an amount of energy equal to $E_{AVAILABLE}$ (or $E_{MAX} - E_{USED}$) to the bus 10 in a time period $\Delta t$ that extends to the remaining amount of time in the current time window ($\Delta t = t_{15} - t_i$ in FIG. 4) (step 200). That is, an amount of energy equal to $E_{AVAILABLE}$ may be transferred to the bus 10 at an energy transfer rate of $E_{AVAILABLE}/\Delta t$. In some embodiments, in step 200, the control system 60 may determine a value of current (I) that will provide an amount of energy equal to $E_{AVAILABLE}$ in a time period ($\Delta t$) using the relation $E = V \times I \times \Delta t$, where V is the voltage. This de-rated value of current may then be directed to the bus 10 by the charging head 30, That is, if providing the minimum amount of energy ($E_{MIN}$) to the bus 10 to complete its route 20 will cause the total energy consumed in the time window to exceed $E_{MAX}$ (step 170 is YES), the control system 60 may de-rate the current such that only the remaining energy available in the time window is provided to the bus in that time window 300.

Since, the amount of energy equal to $E_{AVAILABLE}$ is insufficient for the bus to complete its route, the control system 60 may provide additional energy ($E_{ADDITIONAL}$) to the bus after time window 300 ends and a new time window begins (step 210). Since the additional energy is only provided after the time window 300 ends, the additional energy does not count towards the energy consumed in time period 300. The control system 60 thus charges the bus without exceeding the power consumption that will trigger a rate hike (i.e., increases the demand billing rate). In some embodiments, this additional energy may be calculated based on the default charging schedule (i.e., $E_{ADDITIONAL} = E_{NEED} - E_{AVAILABLE}$), while in some embodiments, $E_{ADDITIONAL}$ may be calculated based on the minimum energy needed to complete a route (i.e., $E_{ADDITIONAL} = E_{MIN} - E_{AVAILABLE}$). The additional energy may be provided at the default charging rate or at a lower charging rate.

With reference to FIG. 4, in some geographic locations 70, a rolling time window is used for utility cost calculations. In such embodiments, when a time window 300 ends, the time window slides to the right by a predetermined amount on the time axis to start a new time window. As the time window slides to the right, portions of the energy consumption curve on the left end (e.g., all or a portion of section 310) of the time window 300 drops out of the new time window freeing up more energy that can be consumed in this new time window. If this freed up energy in the new time window is sufficient to provide $E_{ADDITIONAL}$ to the bus 10 at the default charging rate, the bus 10 may be charged in step 210 at the default charging rate. If not, a lower charging rate (e.g., such that $E_{MAX}$ for the new time window is not exceeded) may be selected. In some embodiments, the new time window may be positioned completely to the right of a previous time window 300. That is, time $t=0$ for the new time window may correspond to time $t=15$ of the previous time window 300. In such embodiments, starting a new time window effectively resets the count of total energy used in the time period (i.e., $E_{USED}=0$), and the bus 10 may be charged in step 210 at the default charging rate.

Several modifications are the possible for the disclosed method 100. For example, in some embodiments, if the control system 60 determines that $E_{USED} + E_{MIN}$ is greater than $E_{MAX}$ (i.e., step 170=YES), then the control system 60 may determine the energy needed by the bus ($E'_{MIN}$) to travel to its next charging event with selected non-essential power consumption sources (HVAC, music, lights, etc.) deactivated. The non-essential power consumption sources may be selected based on conditions such as, for example, the time of day and/or the prevailing weather condition. For example, during day time, the interior/exterior lights of the bus 10 may be considered to be a non-essential power consumption sources. The control system 60 may then determine if $E_{USED} + E'_{MIN}$ is greater than $E_{MAX}$, and provide $E'_{MIN}$ to the bus 10 if $E_{USED} + E'_{MIN}$ is not greater than $E_{MAX}$, before executing step 190. In some embodiments, a user (bus driver, supervisor at the transportation authority, etc.) may be given an option to bypass one or more steps in the method. For example, if the control system 60 determines that $E_{USED} + E_{MIN}$ is greater than $E_{MAX}$ (i.e., step 170=YES), then the control system 60 may allow the user to bypass (e.g., by pressing a button, icon, etc.) the step of de-rating the current (i.e., step 200) and charge the bus with an amount of energy equal to $E_{MIN}$ or $E_{NEED}$. Other modifications that may be made to the charging method 100 will be apparent to a person of ordinary skill in the art.

The disclosed method identifies those charging events that will increase the demand billing rate and adjust them so that the buses are charged without triggering the increased demand billing rate. Since only charging events that affect the demand billing rate are selected for adjustment, the majority of the charging events remain unaffected. Some of the adjusted charging events are modified by eliminating excess amounts of charging and some are modified by extending the charging event to shift at least some of the energy consumption to a new time window. Since only those charging events that are extended affect the schedule of the buses, energy cost is reduced with minimal impacting the bus schedule. Modeling has indicated that, in an exemplary transportation application, a reduction of about 20% in electricity bills for a month can be achieved by adjusting only 2.8% of the charging events in the month and causing minimal impact to the schedule.

While principles of the present disclosure are described with reference to a fleet of electric buses, it should be understood that the disclosure is not limited thereto. Rather, the systems and methods described herein may be employed to manage recharging of any electric vehicle. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description. For example, while certain features have been described in connection with various embodiments, it is to be understood that any feature described in conjunction with any embodiment disclosed herein may be used with any other embodiment disclosed herein.

We claim:

1. A method for controlling the charging of one or more electric vehicles at one or more charging stations in a geographic locality, wherein each electric vehicle of the one or more electric vehicles is configured to be charged at a charging station of the one or more charging stations at a charging event, the method comprising:

determining a maximum amount of energy ($E_{MAX}$) that can be consumed by the charging station in a reference time period without increasing a demand billing rate, wherein the demand billing rate is a cost per unit of energy, and accounts for a demand charge for energy consumed by the one or more charging stations, such that the demand billing rate includes (a) a first cost per unit of energy if a total amount of energy consumed by the one or more charging stations in a reference time period is equal to or below a first value and (b) a second cost per unit of energy, higher than the first cost per unit of energy, if the total amount of energy consumed by the one or more charging stations in the reference time period is above the first value determining a total amount of energy already consumed ($E_{USED}$) by the charging station in the reference time period;

estimating an amount of energy needed ($E_{NEED}$) by the electric vehicle during the charging event;

determining if $E_{NEED}$ exceeds ($E_{MAX}-E_{USED}$);

if $E_{NEED}$ exceeds ($E_{MAX}-E_{USED}$), determining a minimum amount of energy ($E_{MIN}$) needed by the electric vehicle until its next charging event at least based on one or more of a predetermined route for the electric vehicle and historical data associated with the electric vehicle, and determining if $E_{MIN}$ exceeds ($E_{MAX}-E_{USED}$);

if $E_{MIN}$ exceeds ($E_{MAX}-E_{USED}$), determining an amount of energy ($E'_{MIN}$) needed by the electric vehicle to travel to its next charging event if at least one energy consuming system of the electric vehicle is deactivated;

if $E_{MIN}$ does not exceed ($E_{MAX}-E_{USED}$), providing an amount of energy equal to $E_{MIN}$ to the electric vehicle;

determining if $E'_{MIN}$ exceeds ($E_{MAX}-E_{USED}$); and providing an amount of energy to the electric vehicle based on the determined amount of energy ($E'_{MIN}$).

2. The method of claim 1, wherein determining if the charging event increases the demand billing rate includes:

checking if providing a default amount of energy to the electric vehicle during the charging event will cause the amount of energy consumed by the one or more charging stations within the reference time period to exceed $E_{MAX}$.

3. The method of claim 1, wherein determining if the charging event increases the demand billing rate includes predicting whether a subsequent charging event will increase the demand billing rate.

4. The method of claim 2, wherein charging the electric vehicle such that the demand billing rate is not increased includes providing the default amount of energy to the electric vehicle if the checking indicates that providing the default amount of energy will not cause the amount of energy consumed by the one or more charging stations within the reference time period to exceed $E_{MAX}$.

5. The method of claim 4, wherein charging the electric vehicle such that the demand billing rate is not increased includes providing an amount of energy less than the default amount of energy to the electric vehicle if the checking step indicates that providing the default amount of energy will cause the amount of energy consumed by the one or more charging stations within the reference time period to exceed $E_{MAX}$.

6. The method of claim 1, wherein providing the amount of energy less than the default amount of energy includes decreasing the rate of charging during the charging event.

7. A method for charging an electric bus at a charging station, comprising:

electrically connecting the bus to the charging station to begin a charging event;

determining a maximum amount of energy ($E_{MAX}$) that can be consumed by the charging station in a reference time period without increasing a demand billing rate, wherein the demand billing rate is a cost per unit of energy and accounts for a demand charge for energy consumed by the charging station, such that the demand billing rate includes (a) a first cost per unit of energy if a total amount of energy consumed by one or more charging stations in a reference time period is equal to or below a first value and (b) a second cost per unit of energy, higher than the first cost per unit of energy, if the total amount of energy consumed by the one or more charging stations in the reference time period is above the first value;

determining a total amount of energy already consumed ($E_{USED}$) by the charging station in the reference time period;

estimating an amount of energy needed ($E_{NEED}$) by the bus during the charging event;

determining if $E_{NEED}$ exceeds ($E_{MAX}-E_{USED}$);

if $E_{NEED}$ exceeds ($E_{MAX}-E_{USED}$), determining a minimum amount of energy ($E_{MIN}$) needed by the bus until its next charging event at least based on one or more of a predetermined route for the bus and historical data associated with the bus, and determining if $E_{MIN}$ exceeds ($E_{MAX}-E_{USED}$);

if $E_{MIN}$ exceeds ($E_{MAX}-E_{USED}$), determining an amount of energy ($E'_{MIN}$) needed by the bus to travel to its next charging event if at least one energy consuming system of the bus is deactivated;

if $E_{MIN}$ does not exceed ($E_{MAX}-E_{USED}$), providing an amount of energy equal to $E_{MIN}$ to the bus;

determining if $E'_{MIN}$ exceeds ($E_{MAX}-E_{USED}$); and providing an amount of energy to the bus based on the determined amount of energy ($E'_{MIN}$).

8. The method of claim 7, further including, if $E_{MIN}$ exceeds ($E_{MAX}-E_{USED}$), providing an amount of energy equal to ($E_{MAX}-E_{USED}$) to the bus within the reference time period.

9. The method of claim 8, further including providing an amount of energy equal to ($E_{NEED}-(E_{MAX}-E_{USED})$) to the bus after the reference time period.

10. The method of claim 7, further including:

if $E'_{MIN}$ does not exceed ($E_{MAX}-E_{USED}$), providing an amount of energy equal to $E'_{MIN}$ to the bus; and if $E'_{MIN}$ exceeds ($E_{MAX}-E_{USED}$), providing an amount of energy equal to ($E_{MAX}-E_{USED}$) to the bus within the reference time period.

11. The method of claim 7, wherein the reference time period is a time period used to calculate a demand billing rate for energy.

12. A charging station for an electric vehicle, comprising:

charging electrodes configured to electrically couple with charge-receiving electrodes of an electric vehicle during a charging event; and a control system configured to:

determine a maximum amount of energy ($E_{MAX}$) that can be consumed by the charging station in a reference time period without increasing a demand billing rate, wherein the demand billing rate is a cost charged per unit of energy and accounts for a demand charge for energy consumed by the charging station, such that the demand billing rate includes (a) a first cost per unit of energy if a total amount of energy consumed by one or more charging stations in a reference time period is equal to or below a first value and (b) a second cost per unit of energy, higher than the first cost per unit of energy, if the total amount of energy consumed by the one or more charging stations in the reference time period is above the first value;

determine a total amount of energy already consumed ($E_{USED}$) by the charging station in the reference time period;

estimating an amount of energy needed ($E_{NEED}$) by the electric vehicle during the charging event;

determine if $E_{NEED}$ exceeds ($E_{MAX}-E_{USED}$);

if $E_{NEED}$ exceeds ($E_{MAX}-E_{USED}$), determining a minimum amount of energy ($E_{MIN}$) needed by the bus until its next charging event at least based on one or more of a predetermined route for the electric vehicle and historical data associated with the electric vehicle, and determining if $E_{MIN}$ exceeds ($E_{MAX}-E_{USED}$);

if $E_{MIN}$ exceeds ($E_{MAX}-E_{USED}$), determining an amount of energy ($E'_{MIN}$) needed by the electric vehicle to travel to its next charging event if at least one energy consuming system of the electric vehicle is deactivated;

if $E_{MIN}$ does not exceed ($E_{MAX}-E_{USED}$), providing an amount of energy equal to $E_{MIN}$ to the electric vehicle;

determining if $E'_{MIN}$ exceeds ($E_{MAX}-E_{USED}$); and providing an amount of energy to the electric vehicle based on the determined amount of energy ($E'_{MIN}$).

13. The charging station of claim 12, wherein the reference time period is a 15-minute reference time period, wherein the control system is further configured to:

check if providing a default amount of energy to the electric vehicle during the charging event will cause the amount of energy consumed by the charging station within the reference time period to exceed $E_{MAX}$.

14. The charging station of claim 13, wherein the control system is further configured to provide the default amount of energy to the electric vehicle if the checking step indicates that providing the default amount of energy will not cause the amount of energy consumed by the charging station within the reference time period to exceed $E_{MAX}$.

15. The charging station of claim 14, wherein the control system is further configured to provide an amount of energy less than the default amount of energy to the electric vehicle if the checking step indicates that providing the default amount of energy will cause the amount of energy consumed by the charging station within the reference time period to exceed $E_{MAX}$.

16. The charging station of claim 12, wherein the charging head is configured to automatically descend and engage with electrodes positioned on a roof of the electric vehicle to charge an electric vehicle.

* * * * *